(12) United States Patent
Stempnik et al.

(10) Patent No.: US 8,050,813 B2
(45) Date of Patent: Nov. 1, 2011

(54) POWERTRAIN AND IGNITION DIAGNOSTIC SYSTEM AND METHOD

(75) Inventors: Joseph M. Stempnik, Warren, MI (US); Paul A. Bauerle, Fenton, MI (US); Debbie L. Makowske, Commerce Township, MI (US); Tracey A. Bagley-Reed, Canton, MI (US); Sandra J. Nelson, Howell, MI (US)

(73) Assignee: GM Global Technology Operations LLC

( * ) Notice: Subject to any disclaimer, the term of this patent is extended or adjusted under 35 U.S.C. 154(b) by 461 days.

(21) Appl. No.: 12/368,607

(22) Filed: Feb. 10, 2009

(65) Prior Publication Data
US 2010/0204868 A1 Aug. 12, 2010

(51) Int. Cl.
*G01M 15/00* (2006.01)

(52) U.S. Cl. .......................... 701/29; 324/378

(58) Field of Classification Search .......... 307/10.3; 324/378; 701/29, 33, 34, 99; *G01M 15/00*
See application file for complete search history.

(56) References Cited

U.S. PATENT DOCUMENTS

| 6,865,458 B1 * | 3/2005 | Kim ........................... 701/36 |
| 7,027,914 B2 * | 4/2006 | Katrak et al. ................ 701/114 |

* cited by examiner

*Primary Examiner* — Ruth Ilan
*Assistant Examiner* — Laura Freedman

(57) ABSTRACT

A control system comprising a powertrain relay diagnostic module that determines a single continuous period that a powertrain relay voltage is less than an ignition relay voltage, that compares the single continuous period to a single predetermined period, and that diagnoses a powertrain relay out of correlation (OOC) error when the single continuous period is greater than or equal to the single predetermined period, and an ignition relay diagnostic module that diagnoses an ignition relay OOC error when the ignition relay voltage is less than the powertrain relay voltage for a first predetermined cumulative period within a first predetermined total period.

20 Claims, 4 Drawing Sheets

POWERTRAIN AND IGNITION DIAGNOSTIC SYSTEM AND METHOD

FIELD

The present disclosure relates to engine control systems, and more particularly to powertrain and ignition diagnostic systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air-fuel mixture to generate drive torque. Powertrain components inject air and fuel into cylinders to create the air-fuel mixture. Ignition components ignite the air-fuel mixture. A power supply provides power to the powertrain components and the ignition components through a powertrain relay and an ignition relay, respectively.

A powertrain relay voltage and an ignition relay voltage are monitored to ensure that the powertrain relay and the ignition relay are functioning properly. Generally, the powertrain relay voltage and the ignition relay voltage are equal. Powertrain and ignition relay errors may occur due to open relay coils, poor relay contacts, blown fuses, shorted relay coils, shorted or open relay control drivers and wiring, and shorted or open feedback wires.

SUMMARY

The present disclosure provides a control system comprising a powertrain relay diagnostic module that determines a single continuous period that a powertrain relay voltage is less than an ignition relay voltage, that compares the single continuous period to a single predetermined period, and that diagnoses a powertrain relay out of correlation (OOC) error when the single continuous period is greater than or equal to the single predetermined period, and an ignition relay diagnostic module that diagnoses an ignition relay OOC error when the ignition relay voltage is less than the powertrain relay voltage for a first predetermined cumulative period within a first predetermined total period. In addition, the present disclosure provides a method comprising determining a single continuous period that a powertrain relay voltage is less than an ignition relay voltage, comparing the single continuous period to a single predetermined period, diagnosing a powertrain relay OOC error when the single continuous period is greater than or equal to the single predetermined period, and diagnosing an ignition relay OOC error when the ignition relay voltage is less than the powertrain relay voltage for a first predetermined cumulative period within a first predetermined total period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
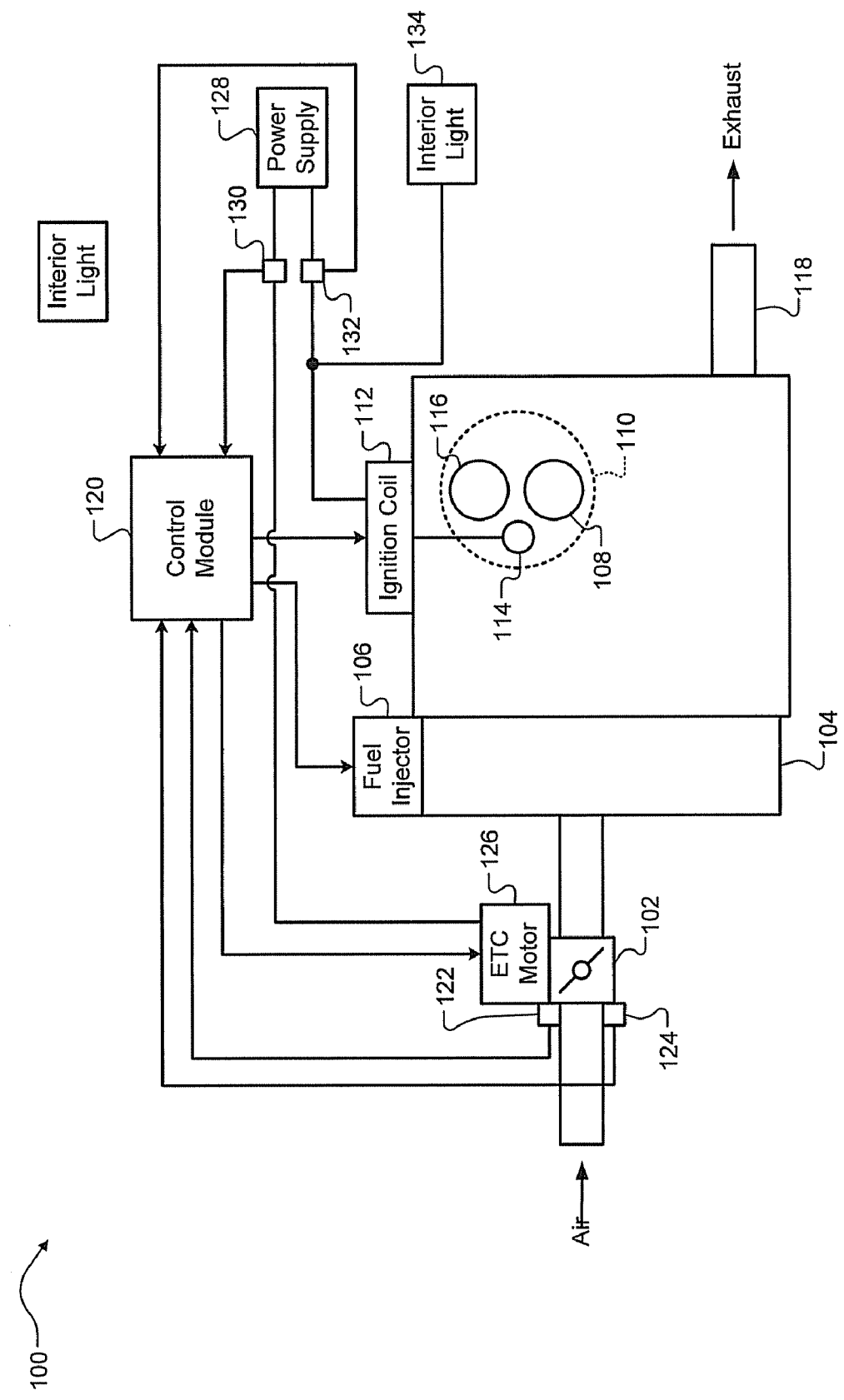
FIG. 1 is a schematic illustration of an engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an engine system 100 is shown. Air is drawn through a throttle valve 102 into an intake manifold 104. An air-fuel mixture is created by injecting fuel from a fuel injector 106 into the intake manifold 104. The air-fuel mixture is drawn through an intake valve 108 into a representative cylinder 110. An ignition coil 112 activates a spark plug 114 to ignite the air-fuel mixture within the cylinder 110. An exhaust valve 116 allows the cylinder 110 to vent the products of combustion to an exhaust system 118.

A control module 120 receives signals from first and second throttle position sensors 122 and 124 indicating first and second throttle positions, respectively. The control module 120 determines an actual throttle position based on the first and second throttle positions. The control module 120 outputs a control signal to an electronic throttle control (ETC) motor 126, which actuates the throttle valve 102. The control module 120 controls the fuel injector 106 and the ignition coil 112. The control module 120 monitors inputs, such as a position of a gas pedal (not shown), determines a desired throttle position, and instructs the ETC motor 126 to actuate the throttle valve 102 to the desired throttle position. The control module 120 diagnoses an ETC actuation error when a difference between the desired throttle position and the actual throttle position is not within a predetermined ETC actuation error range.

A power supply 128 provides power to powertrain components, such as the ETC motor 126, through a powertrain relay 130 and provides power to ignition components, such as the ignition coil 112, through an ignition relay 132. The power supply 128 may provide power to external devices (i.e., non-ignition components), such as an interior light 134, through the ignition relay 132. The control module 120 receives a signal indicating a powertrain relay voltage from the powertrain relay 130 and a signal indicating an ignition relay voltage from the ignition relay 132.

The powertrain and ignition diagnostic system and method of the present disclosure performs a continuous error diagnostic to diagnose a powertrain out of correlation (OOC) error and an intermittent error diagnostic to diagnose an ignition OOC error. The powertrain relay OOC error is diagnosed when the powertrain relay voltage is less than the ignition relay voltage for a predetermined continuous period. The ignition relay OOC error is diagnosed when the ignition relay voltage is less than the powertrain relay voltage for a predetermined cumulative period within a predetermined total period.

Performing a continuous error diagnostic to diagnose the powertrain relay OOC error enables diagnosis of a malfunctioning powertrain relay before the malfunctioning powertrain relay affects control of powertrain components such as the ETC motor 126. Performing an intermittent error diagnostic to diagnose the ignition relay OOC error prevents a false ignition relay OOC error due to external devices connected to the ignition relay, causing the ignition relay voltage to drop slowly. In addition, diagnosis of an ETC actuation error is suspended when the powertrain relay OOC error is diagnosed to prevent a false ETC actuation error due to a fault in the powertrain relay 130. In this manner, the powertrain and ignition diagnostic system and method of the present invention offers improved responsiveness and robustness.

Figure 2:
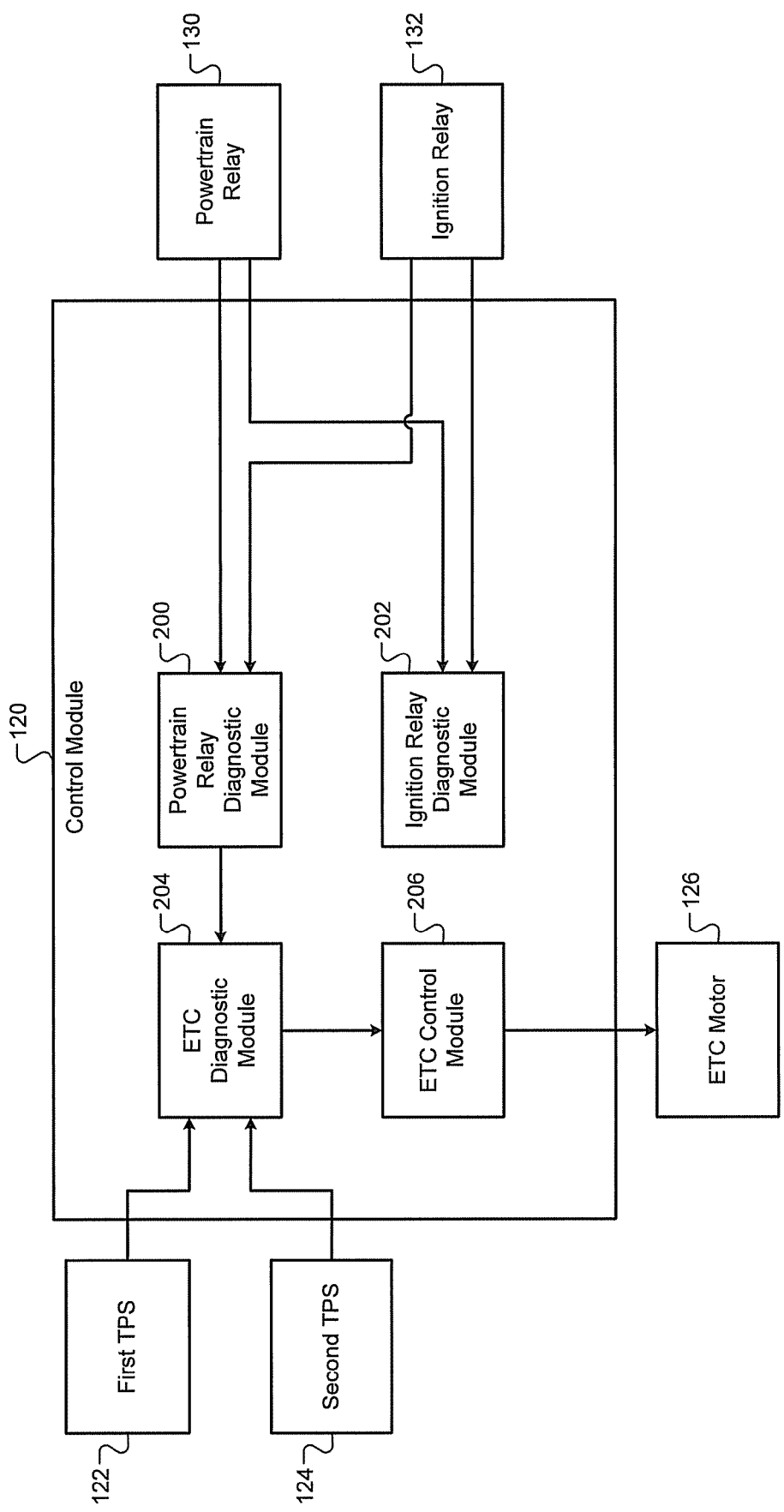
FIG. 2 is a functional block diagram of the control module of FIG. 1 according to the present disclosure.

Referring now to FIG. 2, the control module 120 includes a powertrain relay diagnostic module 200, an ignition relay diagnostic module 202, an ETC diagnostic module 204, and an ETC control module 206. The powertrain relay diagnostic module 200 and the ignition relay diagnostic module 202 each receive a signal indicating the powertrain relay voltage from the powertrain relay 130 and a signal indicating the ignition relay voltage from the ignition relay 132. The powertrain relay diagnostic module 200 and the ignition relay diagnostic module 202 each compare the powertrain relay voltage to the ignition relay voltage.

The powertrain relay diagnostic module 200 diagnoses a continuous powertrain relay OOC error when the powertrain relay voltage is less than the ignition relay voltage for a first predetermined continuous period. For example only, the predetermined continuous period may be 175 milliseconds.

The powertrain relay diagnostic module 200 may diagnose the continuous powertrain relay OOC error when a difference between the ignition relay voltage and the powertrain relay voltage is greater than a continuous powertrain relay correlation threshold for the predetermined continuous powertrain period. The powertrain relay diagnostic module 200 provides a signal to the ETC diagnostic module 204 indicating when a continuous powertrain relay OOC error is diagnosed.

The powertrain relay diagnostic module 200 may diagnose an intermittent powertrain relay OOC error when the powertrain relay voltage is less than the ignition relay voltage for a first predetermined cumulative period within a first predetermined total period. The powertrain relay diagnostic module 200 may diagnose the intermittent powertrain relay OOC error when a difference between the ignition relay voltage and the powertrain relay voltage is greater than an intermittent powertrain relay correlation threshold for the first predetermined cumulative period within the first predetermined total period. The powertrain relay diagnostic module 200 provides a signal to the ETC diagnostic module 204 indicating when an intermittent powertrain relay OOC error is diagnosed.

The ignition relay diagnostic module 202 diagnoses an intermittent ignition relay OOC error when the ignition relay voltage is less than the powertrain relay voltage for a second predetermined cumulative period within a second predetermined total period. For example only, the second predetermined cumulative period may be 3 seconds and the second predetermined total period may be 6 seconds. The ignition relay diagnostic module 202 may diagnose the intermittent ignition relay OOC error when a difference between the powertrain relay voltage and the ignition relay voltage is greater than an intermittent ignition relay correlation threshold for the second predetermined cumulative period within the second predetermined total period.

The ETC diagnostic module 204 receives the first and second throttle positions from the first and second throttle position sensors 122, 124, respectively. The ETC diagnostic module 204 determines an actual throttle position based on the first and second throttle positions. The ETC diagnostic module 204 compares the actual throttle position to a desired throttle position and may diagnose an ETC actuation error when a difference between the actual and desired throttle positions is not within a predetermined ETC actuation error range for a second predetermined continuous period.

The ETC diagnostic module 204 may suspend diagnosing the ETC actuation error when the powertrain relay OOC error is diagnosed. The second predetermined continuous period may be greater than the first predetermined continuous period such that the powertrain relay OOC error is diagnosed before the ETC actuation error. Suspending diagnosis of the ETC actuation error when the powertrain relay OOC error is diagnosed and the second predetermined continuous period is greater than the first predetermined continuous period prevents a false ETC actuation error caused by a fault in the powertrain relay 130.

The ETC control module 206 receives a signal from the ETC diagnostic module 204 indicating when the ETC actuation error is diagnosed. The ETC control module 206 controls the ETC motor 126 to actuate the throttle valve 102 to the desired throttle position. The ETC control module 206 may compensate for a difference between the actual and desired throttle positions when the ETC actuation error is diagnosed.

Figure 3:
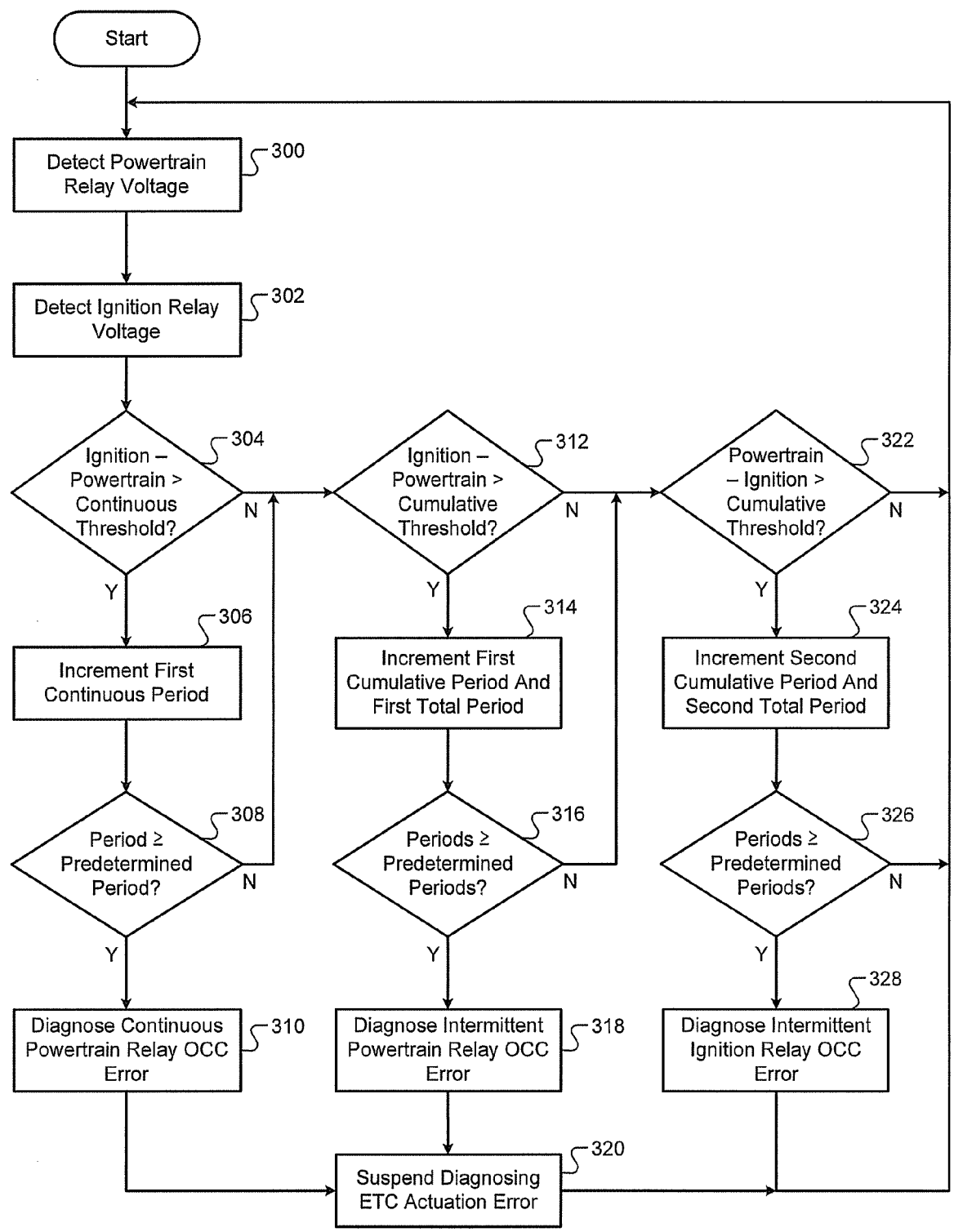
FIG. 3 is a flowchart illustrating exemplary steps of a powertrain and ignition diagnostic method according to the present disclosure.

Referring now to FIG. 3, control diagnoses the powertrain relay voltage and the ignition relay voltage in steps 300 and 302, respectively. In step 304, control determines whether a difference between the ignition relay voltage and the powertrain relay voltage is greater than a continuous powertrain relay correlation threshold. When the difference between the ignition relay voltage and the powertrain relay voltage is greater than the continuous powertrain relay correlation threshold, control increments a first continuous period in step 306 and compares the first continuous period to a first predetermined continuous period in step 308. When the first continuous period is greater than or equal to the first predetermined continuous period, control diagnoses the continuous powertrain relay OOC error in step 310 and proceeds to step 320. When the difference between the ignition relay voltage and the powertrain relay voltage is less than or equal to the continuous powertrain relay correlation threshold or when the first continuous period is less than the first predetermined continuous period, control proceeds to step 312.

In step 312, control determines whether a difference between the ignition relay voltage and the powertrain relay voltage is greater than an intermittent powertrain relay correlation threshold. When the difference between the ignition relay voltage and the powertrain relay voltage is greater than the intermittent powertrain relay correlation threshold, control increments a first cumulative period and a first total period in step 314. In step 316, control determines whether the first cumulative period is greater than or equal to a first predetermined cumulative period and whether the first total period is equal to the first predetermined total period. When the first cumulative period is greater than or equal to the first predetermined cumulative period and the first total period is equal to the first predetermined total period, control diagnoses the intermittent powertrain relay OOC error in step 318 and proceeds to step 320. In step 320, control suspends diagnosing the ETC actuation error and returns to step 300. When the first cumulative period is less than the first predetermined cumulative period or when the first total period is less than the first predetermined total period, control proceeds to step 322.

In step 322, control determines whether a difference between the powertrain relay voltage and the ignition relay voltage is greater than an intermittent ignition relay correlation threshold. When the difference between the powertrain relay voltage and the ignition relay voltage is greater than the intermittent ignition relay correlation threshold, control increments a second cumulative period and a second total period in step 324. In step 326, control determines whether the second cumulative period is greater than or equal to a second predetermined cumulative period and whether the second total period is equal to the second predetermined total period. When the second cumulative period is greater than or equal to the second predetermined cumulative period and the second total period is equal to the second predetermined total period, control diagnoses the ignition relay OOC error in step 328 and returns to step 300. When the second cumulative period is less than the second predetermined cumulative period or when the second total period is less than the second predetermined total period, control returns to step 300.

Figure 4:
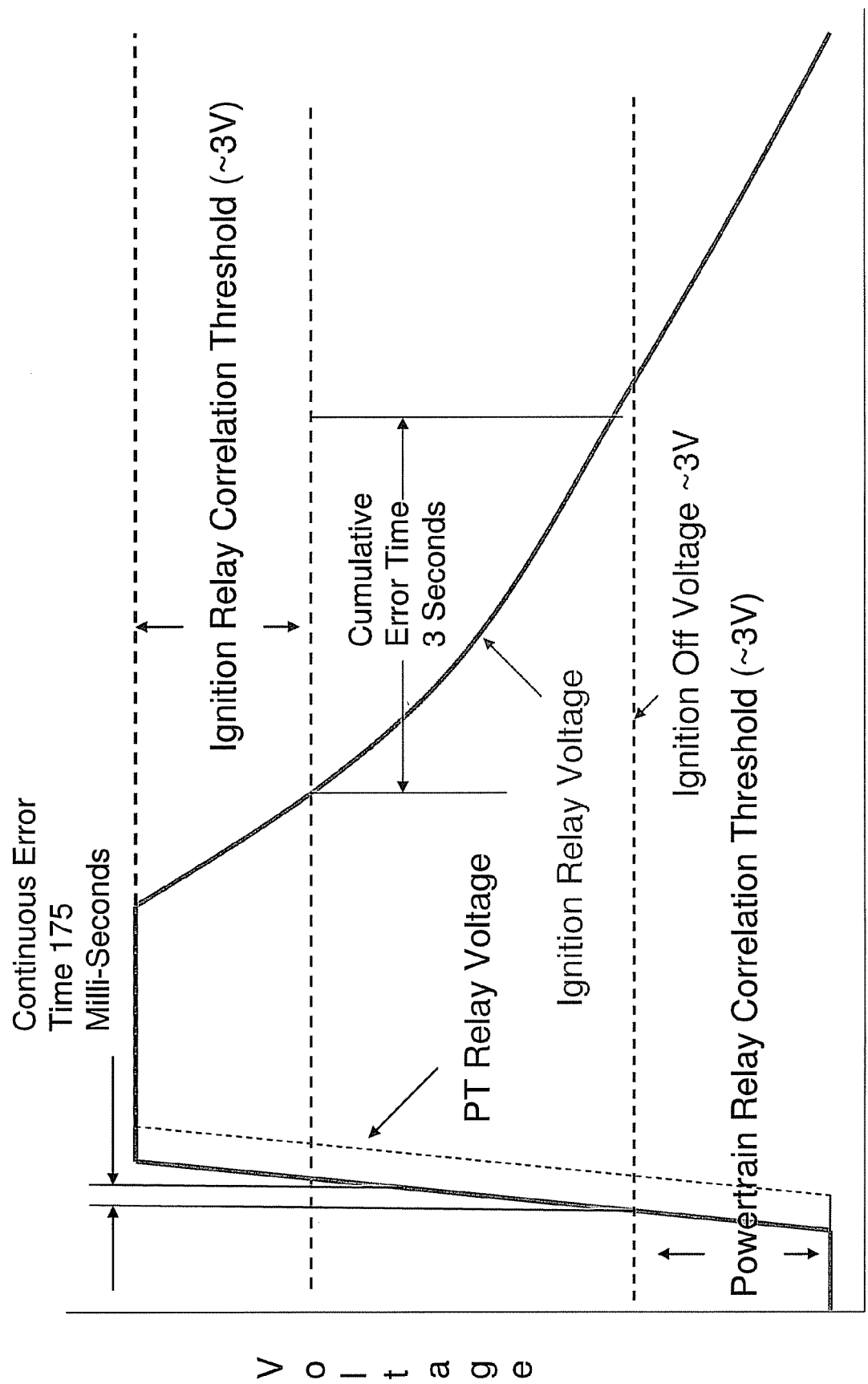
FIG. 4 is a graph illustrating an ignition relay OOC error and a powertrain relay OOC error according to the present disclosure.

Referring now to FIG. 4, the ignition relay OOC error and the powertrain relay OOC error are illustrated. The x-axis represents time elapsed and the y-axis represents voltage. The powertrain relay voltage is represented by a variable-voltage dashed line and the ignition relay voltage is represented by a variable-voltage solid line. The continuous powertrain relay correlation threshold and the intermittent ignition relay correlation threshold are each represented by constant-voltage dashed lines.

Initially, the powertrain relay voltage and the ignition relay voltage are below an ignition off voltage, indicating that an ignition (not shown) is in the "off" position and the power supply 128 is not providing power to the powertrain or ignition components. Then, the ignition is turned to the "on" position and the ignition relay voltage starts to rise before the powertrain relay voltage starts to rise, causing the ignition relay voltage to be greater than the powertrain relay voltage. When a difference between the ignition relay voltage and the powertrain relay voltage is greater than the powertrain relay correlation threshold for the continuous error time of 175 milliseconds, the powertrain relay OOC error is diagnosed.

After a period, the powertrain relay voltage and the ignition relay voltage reach a common operating voltage. Then, an external device connected to the ignition relay 132 is activated, causing the ignition relay voltage to fall below the powertrain relay voltage. When a difference between the powertrain relay voltage and the ignition relay voltage is greater than the ignition relay correlation threshold for at least the cumulative error time of 3 seconds, the ignition relay OOC error is diagnosed.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
    a powertrain relay diagnostic module that determines a single continuous period that a powertrain relay voltage is less than an ignition relay voltage, that compares said single continuous period to a single predetermined period, and that diagnoses a powertrain relay out of correlation (OOC) error when said single continuous period is greater than or equal to said single predetermined period; and
    an ignition relay diagnostic module that diagnoses an ignition relay OOC error when said ignition relay voltage is less than said powertrain relay voltage for a first predetermined cumulative period within a first predetermined total period.

2. The control system of claim 1 wherein said powertrain relay diagnostic module diagnoses said powertrain relay OOC error when a difference between said ignition relay voltage and said powertrain relay voltage is greater than a continuous powertrain relay correlation threshold.

3. The control system of claim 1 wherein said ignition relay diagnostic module diagnoses said ignition relay OOC error when a difference between said powertrain relay voltage and said ignition relay voltage is greater than an ignition relay correlation threshold.

4. The control system of claim 1 further comprising an electronic throttle control (ETC) diagnostic module that selectively diagnoses an ETC actuation error when a difference between desired and actual throttle positions is not within a predetermined ETC actuation error range.

5. The control system of claim 4 wherein said ETC diagnostic module selectively diagnoses said ETC actuation error when said difference between said desired and actual throttle positions is not within said predetermined ETC actuation error range for a predetermined ETC actuation error period.

6. The control system of claim 5 wherein said predetermined ETC actuation error period is greater than said single predetermined period.

7. The control system of claim 6 wherein said ETC diagnostic module suspends diagnosing said ETC actuation error when said powertrain relay diagnostic module diagnoses said powertrain relay OOC error.

8. The control system of claim 1 wherein said powertrain relay diagnostic module diagnoses said powertrain relay OOC error when said powertrain relay voltage is less than said ignition relay voltage for a second predetermined cumulative period within a second predetermined total period.

9. The control system of claim 8 wherein said powertrain relay diagnostic module diagnoses said powertrain relay OOC error when a difference between said ignition relay voltage and said powertrain relay voltage is greater than an intermittent powertrain relay correlation threshold.

10. The control system of claim 1 wherein said powertrain relay voltage is supplied to a powertrain component and said ignition relay voltage is supplied to at least one of an ignition component and a non-ignition component.

11. A method, comprising:
    determining a single continuous period that a powertrain relay voltage is less than an ignition relay voltage;
    comparing said single continuous period to a single predetermined period;
    diagnosing a powertrain relay out of correlation (OOC) error when said single continuous period is greater than or equal to said single predetermined period; and
    diagnosing an ignition relay OOC error when said ignition relay voltage is less than said powertrain relay voltage for a first predetermined cumulative period within a first predetermined total period.

12. The method of claim 11 further comprising diagnosing said powertrain relay OOC error when a difference between said ignition relay voltage and said powertrain relay voltage is greater than a continuous powertrain relay correlation threshold.

13. The method of claim 11 further comprising diagnosing said ignition relay OOC error when a difference between said powertrain relay voltage and said ignition relay voltage is greater than an ignition relay correlation threshold.

14. The method of claim 11 further comprising selectively diagnosing an ETC actuation error when a difference between desired and actual throttle positions is not within a predetermined ETC actuation error range.

15. The method of claim 14 further comprising selectively diagnosing said ETC actuation error when said difference between said desired and actual throttle positions is not within said predetermined ETC actuation error range for a predetermined ETC actuation error period.

16. The method of claim 15 wherein said predetermined ETC actuation error period is greater than said single predetermined period.

17. The method of claim 16 further comprising suspending diagnosing said ETC actuation error when said powertrain relay OOC error is diagnosed.

18. The method of claim 11 further comprising diagnosing said powertrain relay OOC error when said powertrain relay voltage is less than said ignition relay voltage for a second predetermined cumulative period within a second predetermined total period.

19. The method of claim 18 further comprising diagnosing said powertrain relay OOC error when a difference between said ignition relay voltage and said powertrain relay voltage is greater than an intermittent powertrain relay correlation threshold.

20. The method of claim 11 wherein said powertrain relay voltage is supplied to a powertrain component and said ignition relay voltage is supplied to at least one of an ignition component and a non-ignition component.

* * * * *